United States Patent

Simpson et al.

[11] Patent Number: 5,264,129
[45] Date of Patent: Nov. 23, 1993

[54] FILTER DEVICE

[75] Inventors: James R. Simpson, Stocksfield; Martin R. Tucker, Haydon Bridge, both of England

[73] Assignee: Biofil Limited, Liverpool, England

[21] Appl. No.: 23,212

[22] Filed: Feb. 25, 1993

Related U.S. Application Data

[63] Continuation of Ser. No. 674,431, Mar. 22, 1991, abandoned, which is a continuation of Ser. No. 328,098, Mar. 23, 1989, abandoned.

[30] Foreign Application Priority Data

Mar. 25, 1988 [GB] United Kingdom ............... 8807234

[51] Int. Cl.⁵ .......................... C02F 3/10; C02F 3/34
[52] U.S. Cl. ................................. 210/611; 210/615; 210/150; 435/176; 435/179; 435/310
[58] Field of Search ........ 210/601, 610, 611, 615–618, 210/150, 151; 435/174–180, 310, 313

[56] References Cited

U.S. PATENT DOCUMENTS

| | | | |
|---|---|---|---|
| 2,071,591 | 2/1937 | Tholin .................... | 210/616 |
| 3,660,278 | 5/1972 | Mimura et al. ........ | 210/611 |
| 3,769,164 | 10/1973 | Azarowicz ............ | 210/611 |
| 3,843,517 | 10/1974 | McKinney et al. .... | 210/611 |
| 4,029,546 | 6/1977 | Brouillard ............. | 195/31 R |
| 4,055,490 | 10/1977 | Hasegawa et al. .... | 210/616 |
| 4,427,548 | 1/1984 | Quick, Jr. .............. | 210/617 |
| 4,708,792 | 11/1987 | Takarebe et al. ...... | 210/150 |
| 5,096,814 | 3/1992 | Aivasidis et al. ..... | 210/601 |

FOREIGN PATENT DOCUMENTS

| | | |
|---|---|---|
| 0161912 | 11/1985 | European Pat. Off. . |
| 2365528 | 9/1977 | France . |
| 2593188 | 7/1987 | France . |
| 61-167498 | 7/1986 | Japan . |
| 0374125 | 6/1932 | United Kingdom . |
| 1533363 | 11/1978 | United Kingdom . |
| 1574922 | 9/1980 | United Kingdom . |
| 2153808 | 8/1985 | United Kingdom . |

*Primary Examiner*—Thomas Wyse
*Attorney, Agent, or Firm*—Rodman & Rodman

[57] ABSTRACT

A filter device for use in the treatment of water to render it potable, which is of particular value in emergency situations, comprises exo-polysaccharide producing, gram-negative bacteria supported upon a water-permeable material which is non-toxic to microorganisms and to human beings, is resistant to temperatures within the range from $-15°$ C. to $+65°$ C., and is not readily biodegradable. The device may be freeze-dried to enable it to be stored until it is required for use and may then be reactivated by the addition of water. It may be used as the surface layer in a slow-sand filter.

21 Claims, 1 Drawing Sheet

FILTER DEVICE

This is a continuation of application Ser. No. 674,431 filed Mar. 22, 1991, abandoned, which is a continuation of application Ser. No. 328,098 filed Mar. 23, 1989, now abandoned.

The present invention is a filter device for the treatment of water to render it potable and is of particular value in emergency situations where microbiologically safe water is required with the minimum of delay and where disinfecting agents are not readily or continuously available, or acceptable.

Nearly all water-treatment plants include as an essential feature the filtration of the available water through sand. The two main types of sand filtration process are described respectively as slow and rapid sand filtration, which names reflect the relative rates of flow of the aqueous liquid through the filter medium. However, these two types of sand filtration process are also distinguished by fundamental differences of operating procedure.

In the case of rapid sand filters, the water is treated to coagulate the finely-divided and suspended impurities (including many of the harmful micro-organisms present) in flocculating tanks, after which the large particles formed by coagulation are removed in settlement tanks. Pretreatment of the water in this way makes it possible to carry out the filtration through sand at a faster flow-rate. No such pretreatment is carried out in the case of slow sand filters.

In slow sand filters, removal of impurities, and particularly harmful microorganisms, is effected not only by physical straining through the upper layers of the sand grains, but also by the entrapment of the impurities by microorganisms which develop in the upper layer of the sand: this is commonly known as the "Schmutzdecke" layer, which initially may take several weeks to develop and in the slow sand filter plays a key role in producing a high quality water.

In an emergency situation in which supplies of safe potable water need to be established and wherein sources of chemical treatment agents such as disinfectants are not readily available, it would in principle be desirable to use a slow sand filter for the purpose. However the creation of the necessary Schmutzdecke layer takes such a long time that slow sand filters have until now been wholly unsuitable for use in an emergency.

Against this background, it is an object of the present invention to provide a filter device which is of value in emergencies and other situations and which may be used to establish supplies of safe water in a matter of hours.

The filter device according to the present invention comprises exo-polysaccharide producing, gram-negative bacteria supported upon a water-permeable material which is non-toxic to microorganisms and to human beings, is resistant to temperatures within the range from $-15°$ C. to $+65°$ C., and is not readily biodegradable. This novel filter device, which may be used as a replacement in a slow sand filter for the conventional Schmutzdecke layer, is available for producing potable water in a fraction of the time which would be required for the creation of a usual Schmutzdecke layer.

In one preferred form of the filter device according to the present invention, the device is freeze-dried after the bacteria have been applied to the water-permeable material. The freeze-dried product may then be vacuum packed so as to exclude moisture and stored until required for use. When an emergency arises in which potable water is required urgently, the product may be reactivated within a few hours by the addition of water and then be used, suitably supported, for the purification of available water in the manner of a slow sand filter.

The exo-polysaccharide producing, gram-negative bacteria employed in the filter device of the invention are of a type which is found in Schmutzdecke layers; that is, they occur naturally in the biofilm layer of a standard slow-sand water filter, especially in the region within 5 cm, more especially 2.5 cm, of the surface of the filter medium. Such naturally-occurring bacteria are characteristically producers of copious amounts of polysaccharides in the form of a viscous or gelatinous material, under conditions of low nutrient concentrations. The bacteria used in the present invention may be a mixture of bacteria obtained as such from a Schmutzdecke layer or may be pure cultures of single strains of a bacterium, used singly or in mixtures. Among suitable bacteria may be mentioned strains of *pseudomonas vesicularis*, for example NCIB40121; *zoogloea ramigera*, for example ATCC 25935 or NCIB 10340; pseudomonas sp., for example NCIB 11264; *achromobacter georgiopolitanum*, for example ATCC 23203; and non-pathogenic alginate-producing pseudomonads such as *pseudomonas mendocina*, for example NCIB 10541.

The particularly preferred bacterium for use in the filter device according to the present invention is that which is part of the dominant microbial flora in the surface biofilm of an established conventional slow sand filter and which is deposited as NCIB 40121. It has the following properties, namely unpigmented rapid growth on Medium A (see below), copious polysaccharide slime production on Medium B (see below) both in liquid medium and on medium solidified with 1.5 per cent agar, no or very poor growth on full strength standard bacteriological Nutrient Agar media, and no growth on McConkey Agar. In the foregoing and hereinafter, Medium A is the product Nutrient Broth of M-Lab Ltd., at a concentration of 2.5 g/liter, containing 1.0 g/liter of glucose. Medium B is Nutrient Broth at a concentration of 2.5 g/liter containing 10.0 g/liter of glucose.

The selected bacterium or mixture of bacteria is supported upon a water-permeable material of the characteristics specified above. The material employed should be not readily biodegradable but material which biodegrades relatively slowly, for example over the period of use of the device, which may typically be say from 3 to 6 months, is suitable for this purpose. Preferably the material is resistant to ultraviolet radiation, to enable it to be used in conditions of prolonged strong sunlight. In order to permit the colonisation of microorganisms on its surface, it is desirable that the surface of the material should be not highly polished nor smooth. Of course the selected water-permeable material should be of low solubility, or insoluble, in aqueous liquids.

The water-permeable material may take various forms. Thus, for example, it may be a rigid or compressible porous material such as an expanded polymeric material, or a fibrous mat such as of coir, or a non-woven fabric such as a paper-like product, or a woven product such as of cotton or of a cellulosic material. A suitable expanded material is the cellulosic sponge sold under the trade mark "Spontex" (of Spontex Ltd.). When a flexible material of this type is used, it may be stored and/or conveyed in rolled and/or compressed form. A suitable non-woven material is the product sold under the trade mark "Vilene", which is offered for sale as a tailor's interfacing material. Thin sheet materials such as "Vilene" may be used in single or multiple layers, or sandwiched with other materials for support.

If the selected water-permeable material is porous it should, of course, be open-pored. The average pore diameter is preferably at least 10 microns both before and after impregnation with the bacteria. More preferably, the average pore diameter is at least 20 microns, especially of the order of 50 microns, before impregnation. Both the pore diameter and the pore density affect the rate at which the water to be purified can pass through the filter device and this should be borne in mind in selecting the water-permeable material to be used. With this in mind, porosities of 70 to 90 percent and higher are preferred.

If the filter device is to be freeze-dried, then conditions typical for freeze-drying processes may be used for that purpose. Preferably the impregnated material is frozen at a temperature of the order of minus 70 degrees Centigrade or lower. The subsequent removal of water by sublimation under vacuum is preferably carried out under a vacuum of 1 torr or below that pressure. Following freeze-drying, the impregnated material is sealed in any suitable material which is impermeable to water-vapour, for example a sheet synthetic polymeric material. When the freeze-dried product is subsequently required for use, the vacuum seal is broken and water is added, with the result that within several hours (for example 6 to 8 hours) the microorganisms are reactivated and ready for use. To promote reactivation and growth of the freeze-dried microorganisms, microbial nutrients may be incorporated in the impregnated material before the freeze-drying step, or may be added to the water used for reactivation.

In order to use the filter device according to the invention, it may be placed in contact with a bed of sand or another filter support medium and then the water to be purified is passed through the device and the filter support medium in turn. For example, the device may be laid horizontally upon a bed of sand or attached in a vertical position to one or more blocks of a rigid porous support medium. Suitable simple structures for this purpose are shown in the attached drawings, wherein.

Figures 1, 3:
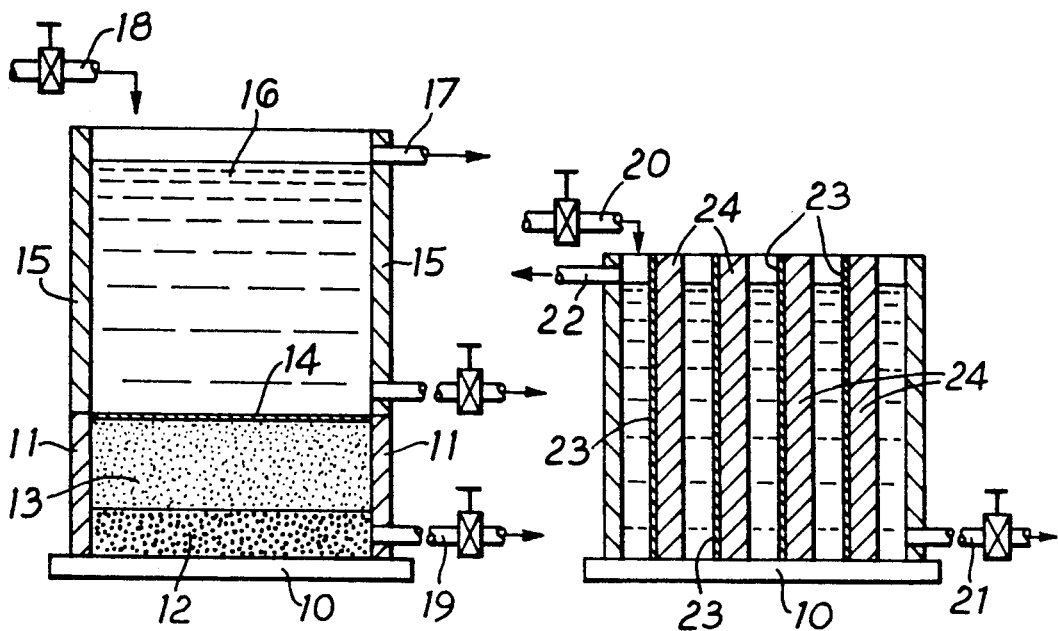
FIG. 1 is a vertical sectional elevation of a first form of filter unit.
FIG. 3 is a vertical sectional elevation of a second form of filter unit.
Figures 2, 4:
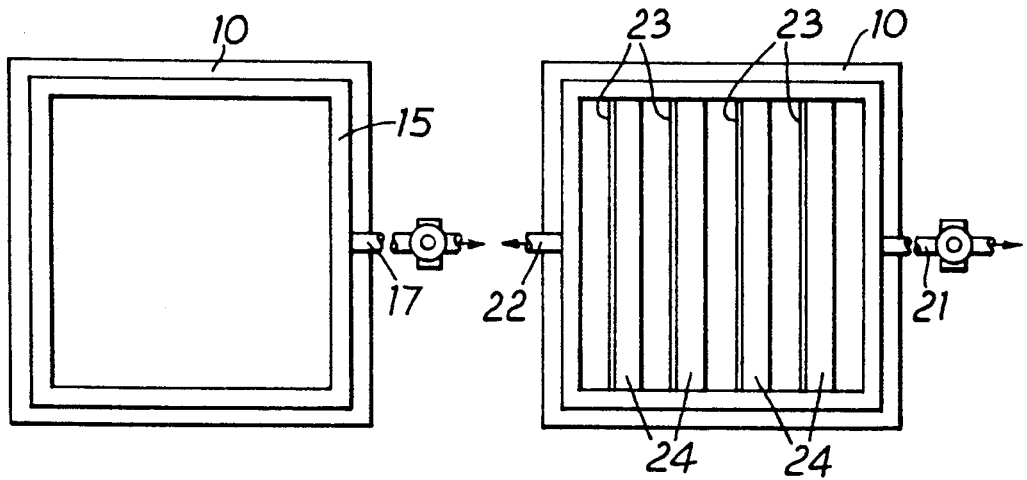
FIG. 2 is a plan view corresponding to FIG. 1.
FIG. 4 is a plan view corresponding to FIG. 3.

The filter unit illustrated in FIGS. 1 and 2 is, as shown, square in plan (for example approximately 1 meter square) and somewhat taller than it is wide (say about 1.5 meters). It is formed of flanged flat tank sections made in glass-reinforced plastic, assembled in situ from a readily transportable pack, upon a support plinth 10. Within the lower part of the unit defined by side sections 11 are underdrains 12 of gravel or similar material and above the underdrains 12 is a support medium 13 of sand.

A filter device 14 according to the invention in the form of a bacterial layer on a flexible water-permeable material is supported by the medium 13. The edges of the device 14 are held and sealed between the flanges of the side sections 11 and upper side sections 15. The level of water 16 in the unit is controlled by an overflow 17.

In use of the unit, water for treatment is introduced to the upper part of the tank by an inlet pipe 18 and percolates through the filter device 14 and the support medium 13 to the underdrains 12, potable water being withdrawn via a valved outlet pipe 19. When, in use, the filter device 14 eventually becomes blocked, it is readily replaced by a new one.

The unit illustrated in FIGS. 3 and 4 relies upon vertical filter panels, through which the water flows in a generally horizontal direction from an inlet 20 to an outlet 21, the water level being controlled by an overflow 22. The filtering system consists of filter devices 23 according to the invention, attached at their edges to blocks 24 of a porous support medium, placed at spaced positions vertically in the water tank.

In the case of the unit of FIGS. 3 and 4, when a filter device eventually becomes blocked, it and the associated support block 24 may easily be replaced without the need to take the unit overall out of service.

In experimental use of each of the illustrated units, high removals of pathogenic microorganisms have been achieved within hours of the initiation of the reactivation of the supported bacteria.

The invention is further described and illustrated by means of the following Examples, which describe the preparation of two embodiments of the filter device according to the invention and the use of one of the resulting devices to purify contaminated water. In both cases, the bacterium used was the particularly preferred bacterium described above and identified by the Deposit No. NCIB 40121.

EXAMPLE 1

The Maintenance Medium is the above-described Medium B solidified with 1.5 percent (w/v) agor. For long-term storage, bacteria grown on Maintenance Medium at 30° C. for 48 hours are suspended in Medium B containing glycerol (20% w/v) and stored at −70° C. in screw-capped bottles. In all cases the glucose, sterilised separately by autoclaving at 121° C. for 15 min, is added after the medium has been sterilised in the same way.

(a) Growth of Inoculum

The slime-producing bacterium is inoculated from a maintenance plate into 50 ml Medium A in a 250 ml capacity conical flask and incubated in a shaker-incubator at 100 rpm, 30° C. for 16 hours. This culture is used to inoculate (2% vol/vol) 50 ml of the same medium, and the culture is incubated as above for 6 hours.

(b) Inoculation of Water-Permeable Material and Growth of Bacteria

Sterile discs, 5 cm. diameter, of a cellulosic sponge material sold as "Spontex", that has been washed at 121° C. in distilled water under pressure in an autoclave, are incubated in the above inoculum, under the same conditions, for 3 hours. The inoculated filter discs are transferred aseptically to 50 ml of Medium B in a 250 ml capacity conical flask, and incubated at 30° C., 100 rpm, in an orbital incubator until sufficient slimy biofilm has been established to provide a resistance to water flow such that a linear flow rate of approximately 0.2 m/hour is obtained through the filter under a hydrostatic head of 10 cm. A typical time of incubation taken to achieve this amount of biofilm will be between 8 and 16 hours depending on the initial pore size of the support material. A larger pore size predicates a longer incubation period.

EXAMPLE 2

The procedure described in Example 1 is used to establish biofilms in 5 cm diameter discs of 1 to 2 mm thick layers of the non-woven fabric sold under the trade mark "Vilene". A suitable biofilm was formed after 8 hours of incubation.

EXAMPLE 3

By the same procedure as used in Examples 1 and 2, a biofilm was formed in 5 cm diameter discs comprising a 10 mm thick layer of coir fibrous matting strengthened with plastic net. The final incubation time was 16 hours.

EXAMPLE 4

Laboratory Measurement of Filter Performance

Performance is assessed using 5 cm diameter biofilm-impregnated discs as prepared in Examples 1 to 3 in standard laboratory filter holders with plastic mesh support screens, under a hydrostatic head of 10 cm. Two types of test water are used (a) faecal coliform-contaminated natural water, typically incoming water to a municipal water treatment works; (b) phosphate-buffered saline containing a laboratory strain of *Escherichia coli* that carries a nalidix acid-resistance gene, (between 10,000 and 20,000 bateria/100 ml). The coliform bacterial count (used as a measure of water quality) is measured in both waters by the standard international procedures (principally the use of a selective medium—McConkey's medium—in multiple tube and filter assays, and standard confirmatory tests for *E.coli*). Nalidixic acid-resistant bacteria are counted by plating 0.1 ml samples of the contaminated water on to Nutrient Agar (M-Lab Ltd.) plates containing nalidixic acid at 10 μg/ml. The effluent water from the filters is assayed for coliform contamination as described above in successive 200 ml batches of filtrate. Typically the coliform count is reduced to less than 10 bacteria per 100 ml in the second 200 ml of filtrate and remains below this level in subsequent 200 ml batches (at least 10).

EXAMPLE 5

Production on a Large Laboratory Scale

The water-permeable support material used is a 1-meter-square sheet of the cellulosic sponge sold under the trade mark "Spontex", 15 mm to 20 mm thick. This sheet is washed in distilled water by autoclaving at 121° C. for 2 hours and is subsequently squeezed dry. The sheet is fully immersed in Medium A in a laboratory fermenter and sterilised with the medium, in-situ. The glucose is sterilised separately as in Example 1, and added aseptically. The fermenter temperature in equilibrated at 30° C. and a 5% (by volume) inoculum of bacterial culture, prepared as for the inoculum in Example 1, is added. The fermenter is aerated at 1 liter air/-min/liter of culture medium, and stirred at 200 rpm. After 8 hours, sterile glucose (40% w/v) is added to give a final concentration of 10 g/liter and incubation is continued under the same conditions for a further period of between 16 and 24 h. ; dissolved oxygen levels are not controlled.

The impregnated sheet obtained is suitable for use in a filter unit such as one of the two types illustrated in the accompanying drawings.

We claim:

1. A flow-through filter device for use in the purification of water comprising:

(a) a water permeable support member of predetermined size for location in a fixed position in a filter tank which has an inlet and an outlet to permit water flowing from the inlet to the outlet to flow through the support member, said support member being non-toxic to microorganisms and to human beings, and having a surface texture that permits colonization of microorganisms thereon, said support member being resistant to temperatures within the range of about −15° C. to +65° C., and substantially non-biodegradable;

(b) a film of exo-polysaccharide producing gram negative bacteria contacted to said support member in a predetermined amount to permit ready use of said support member and said film as a water purification filter; wherein said film of bacteria and said support member form an integral structural component, and are adapted to permit a predetermined incoming flow of unpotable water to pass therethrough such that the unpotable water exits from said film and said support member in a purified state.

2. A filter device according to claim 1, wherein the bacteria are at least one of the bacteria identified by the Deposit Nos. NCIB 40121, ATOC 25935, NCIB 10340, NCIB 11264, ATCC 23203 and NCIB 10541.

3. A filter device according to claim 2, wherein the bacteria is identified by Deposit No. NCIB 40121.

4. A filter device according to claim 1, wherein the bacteria are of a type occurring naturally in the biofilm layer of a slow sand-water filter.

5. A filter device according to claim 1, in a freeze-dried and vacuum-packed state.

6. A filter device according to claim 1, wherein the water permeable material is selected from the group consisting of a rigid or compressible porous material.

7. A filter device according to claim 6, wherein the porous material is a resilient cellulosic sponge.

8. A filter device according to claim 6, wherein the porous material has a porosity of at least 70 per cent.

9. A filter device according to claim 1, wherein the water permeable material is selected from the group consisting of an expanded polymeric material, a fibrous mat, a non-woven fabric, a woven product, and a cellulosic product.

10. A filter device according to claim 1, wherein the water permeable material is selected from the group consisting of coir, cotton, sponge, and tailor's interfacing material.

11. A filter device according to claim 1, wherein the water permeable support member has an average pore diameter of at least 10 microns.

12. A filter device according to claim 1, wherein said film and said support member are freeze dried together and enclosed in a water-impermeable material for storage until ready for use.

13. A filter device according to claim 1, wherein the support member comprises a non-woven fibrous sheet material having deposited thereon a multiplicity of ex-opolysaccharide producing gram negative bacteria.

14. A filter device according to claim 1 including means for holding a plurality of said integral structural components in spaced relationship to permit sequential flow of water through each said structural component.

15. A process for producing a filter device for use in the purification of water, comprising forming a water permeable support material of predetermined size for disposition in a fixed position in a filter tank to permit water flowing through the filter tank to flow through the support member, depositing a predetermined amount of exopolysaccharide producing gram-negative upon the water-permeable material to permit ready use of the device as a water purification filter, freezing the bacteria and water-permeable material, removing water therefrom by sublimation under vacuum, and containing the resulting freeze-dried product in a water-impermeable material for storage until ready for use.

16. A process according to claim 15, wherein the bacteria are subsequently reactivated by removing the water-impermeable material and adding water to the freeze-dried product to prepare the freeze-dried product for use.

17. A flow-through filter device for use in the purification of water comprising,
   (a) a preformed filtration structure having a predetermined size for disposition in a filter tank which receives a flow of incoming water for purification, said predetermined size substantially corresponding to the cross-sectional size of the flow path of water in the filter tank in which the filter is disposed including
      (i) a film of exo-polysaccharide producing gram negative bacteria,
      (ii) a support member for said film of bacteria having a surface to which said film is contacted, said support member being formed of water-permeable material that is nontoxic to microorganisms and said surface having a texture that permits colonization of microorganisms from said film, whereby said preformed filtration structure is disposable as a unit in the filter tank across the flow path of water to filter and purify the water as it flows into and out of the filter tank.

18. A method for purifying water into a potable state, comprising contacting unpotable water with a filter device for a time sufficient to remove pathogenic microorganisms to the extent necessary to purify the water, wherein said filter device comprises exo-polysaccharide producing, gram-negative bacteria supported upon a water-permeable material which is non-toxic to microorganisms and to human beings, is resistant to temperatures within the range from $-15°$ C. to $+65°$ C., and is not readily biodegradable.

19. A method according to claim 18, wherein the bacteria are at least one of the bacteria identified by the Deposit Nos. NCIB 40121, ATCC 25935, NCIB 10340, NCIB 11264, ATCC 23203 and NCIB 10541.

20. A method according to claim 18, wherein the coliform count is reduced to less than 10 bacteria per 100 milliliters of effluent water.

21. A method according to claim 18, wherein the water permeable material is selected from the group consisting of a rigid or compressible porous material.

* * * * *

UNITED STATES PATENT AND TRADEMARK OFFICE
CERTIFICATE OF CORRECTION

PATENT NO. : 5,264,129

DATED : November 23, 1993

INVENTOR(S) : James R. Simpson et al

It is certified that error appears in the above-identified patent and that said Letters Patent is hereby corrected as shown below:

| Column 6, line 25 | change ATOC to --ATCC-- | Original claim 3, line 3 |
| Column 7, line 3 | after "gram-negative" insert --bacteria-- | Amendment filed 2-25-93 at claim 23 |

Signed and Sealed this

Thirty-first Day of May, 1994

Attest:

BRUCE LEHMAN

Attesting Officer    Commissioner of Patents and Trademarks